(No Model.)
R. M. ADAM.
ATTACHMENT FOR DREDGING PUMPS.
No. 257,633. Patented May 9, 1882.
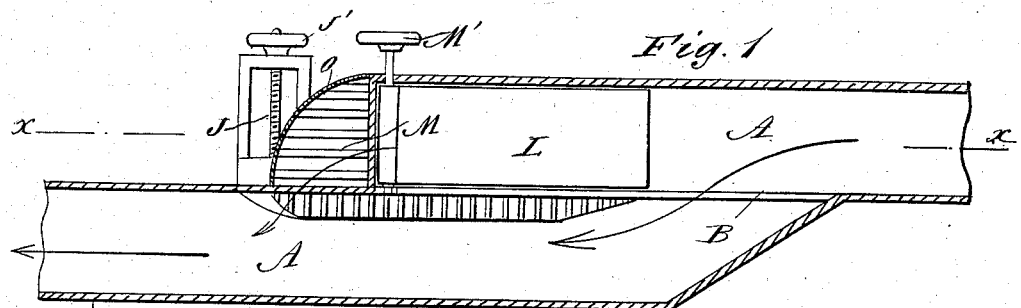
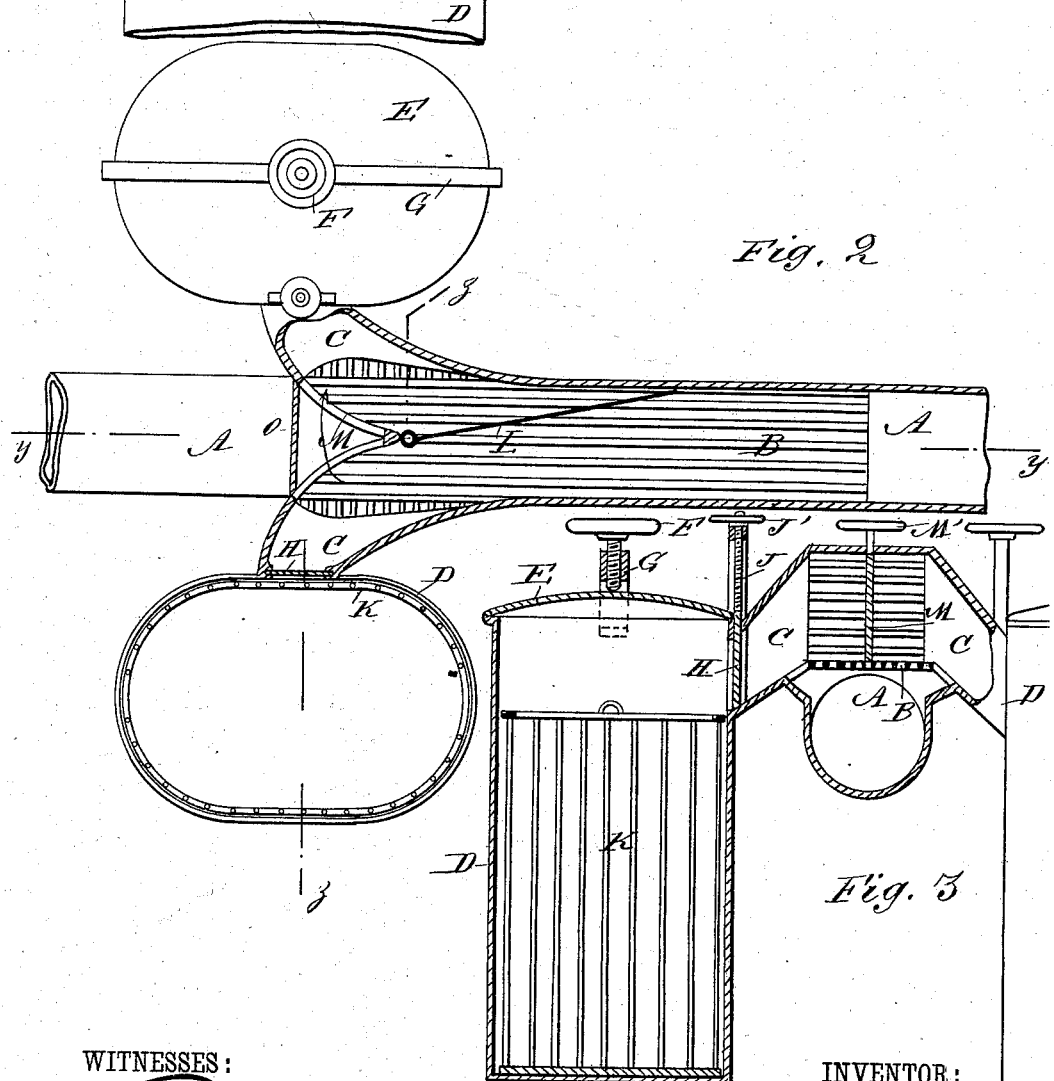
WITNESSES:
C. Neveux
C. Sedgwick
INVENTOR:
R. M. Adam
BY Munn & Co
ATTORNEYS.

UNITED STATES PATENT OFFICE.

ROBERT M. ADAM, OF CHARLESTON, SOUTH CAROLINA.

ATTACHMENT FOR DREDGING-PUMPS.

SPECIFICATION forming part of Letters Patent No. 257,633, dated May 9, 1882.

Application filed August 27, 1881. (No model.)

*To all whom it may concern:*

Be it known that I, ROBERT MARSDEN ADAM, of Charleston, in the county of Charleston and State of South Carolina, have invented a new and Improved Attachment for Dredging-Pumps, of which the following is a full, clear, and exact description.

The invention is designed for pumps used to raise valuable stones, rocks, or gravel—such as phosphate rock—from the bed of rivers; and its object is to prevent injury to and choking of these pumps.

The invention consists in a cage arranged at an angle or knee of the pump tube for the purpose of arresting and catching the larger gravel and stones or rocks that are drawn upward by the pump, and thereby prevent the entrance of such stones into the pump, and thus also prevent damaging or breaking of the pump. The pump-tube is provided with a pivoted switch-plate for guiding the stones into the basket on one side or the other of the pump-tube.

In the accompanying drawings, Figure 1 is a longitudinal sectional elevation of my attachment for dredging-pumps on the line $y\ y$, Fig. 2. Fig. 2 is a horizontal sectional view of the same on the line $x\ x$, Fig. 1. Fig. 3 is a cross-sectional elevation of the same on the line $z\ z$, Fig. 2.

Similar letters of reference indicate corresponding parts.

The pump-tube or suction-tube A of a rotary or other pump is provided with a sieve or grating, B, arranged at an elbow or angle of this tube, so that the water flowing from one part of the tube into the other must pass this sieve or grating. At this grating the tube A is provided with two opposite side branches or channels, C, leading into the drums D, each provided with a removable cover, E, held in place by a screw, F, and clamps G. A valve, H, operated by a screw-rod, J, provided with a hand-wheel, J', closes the end of each branch C. A basket, K, made of grating work, is contained in each drum D. A wing, L, is pivoted to the corner formed by two gratings, M, at the end of the upper section of the knee of the pipe A, the curved plate or wall O, forming the end of this upper section, thus permitting this wing L to be swung against the side of the tube above the grating B, so that this wing will guide the water and rocks into one of the drums D, as may be desired.

The operation is as follows: The rock of the bed of the river is broken or loosened by means of some suitable devices, and these pieces of rock are then raised by creating a strong current of water. This current is created by means of a pump, preferably a rotary pump, at the upper end of the suction or pump-tube A. The water passes through this tube in the direction indicated by the arrows, and carries the pieces of rock upward. As large pieces of rock would damage the pump, the above-described devices have been provided to prevent such accidents. The small pieces of stone can pass through the sieve B, and can pass into and through the pump; but the larger pieces of rock will pass through the branch pipes C into the baskets K. By means of the switch-plate L the large pieces of stone can be directed into one branch pipe or side channel, C, the other being closed by this switch-plate. At the same time the gate H of the side channel so cut off must be closed, so that no water can flow into the corresponding drum D, for during this time the cover C of this drum is removed, and the filled basket K is replaced by an empty basket. When one basket K is being filled the other is being emptied.

Having thus described my invention, I claim as new and desire to secure by Letters Patent—

1. The combination, with the pump-tube A, of the sieve or grating B, arranged in the bottom of the said tube at a knee or elbow of the same, substantially as shown and described, whereby large pieces of rock are prevented from entering and injuring the pump, as set forth.

2. The combination, with the pump-tube A, of the grating B, the side channels, C, above the grating B, substantially as herein shown and described, and for the purpose set forth.

3. The combination, with the pump-tube A, of the grating B, the side channels, C, and the drums D, substantially as herein shown and described, and for the purpose set forth.

4. The combination, with the pump-tube A, of the grating B, the side channels, C, the drums D, and the removable baskets K, substantially as herein shown and described, and for the purpose set forth.

5. The combination, with the pump-tube A, of the grating B, the side channels, C, the drums D, and the pivoted or swinging switch-plate L, substantially as herein shown and described, and for the purpose set forth.

6. The combination, with the pump-tube A, of the grating B, the side channels, C, the drums D, the pivoted switch-plate L, and the gates H, substantially as herein shown and described, and for the purpose set forth.

ROBT. M. ADAM.

Witnesses:
JACOB WILLIMAN,
WM. L. KING.